United States Patent
Ishii et al.

(10) Patent No.: US 9,784,890 B2
(45) Date of Patent: Oct. 10, 2017

(54) LENS ARRAY SHEET HAVING GLASS BASE AND NANOPARTICLE-CONTAINING RESIN LENS ARRAY LAYER WITHOUT A RESIN PLANAR LAYER THEREBETWEEN

(75) Inventors: Kazuhisa Ishii, Kishiwada (JP); Kenjiro Nakamoto, Kishiwada (JP); Atsushi Nakano, Kishiwada (JP)

(73) Assignee: Matsunami Glass Ind. Ltd., Osaka (JP)

( * ) Notice: Subject to any disclaimer, the term of this patent is extended or adjusted under 35 U.S.C. 154(b) by 36 days.

(21) Appl. No.: 14/112,010

(22) PCT Filed: Apr. 4, 2012

(86) PCT No.: PCT/JP2012/002373
§ 371 (c)(1),
(2), (4) Date: Oct. 15, 2013

(87) PCT Pub. No.: WO2012/140853
PCT Pub. Date: Oct. 18, 2012

(65) Prior Publication Data
US 2014/0043681 A1    Feb. 13, 2014

(30) Foreign Application Priority Data
Apr. 12, 2011  (JP) .................... 2011-087927

(51) Int. Cl.
| G02B 3/00 | (2006.01) |
| G02B 27/22 | (2006.01) |
| B82Y 20/00 | (2011.01) |
| B29D 11/00 | (2006.01) |

(52) U.S. Cl.
CPC ............ *G02B 3/0012* (2013.01); *B82Y 20/00* (2013.01); *G02B 3/005* (2013.01); *G02B 27/2214* (2013.01); *B29D 11/00298* (2013.01); *G02B 2207/101* (2013.01)

(58) Field of Classification Search
None
See application file for complete search history.

(56) References Cited

U.S. PATENT DOCUMENTS

| 2003/0227688 A1 | 12/2003 | Houlihan et al. |
| 2006/0078271 A1 | 4/2006 | Hayashi |
| 2007/0172772 A1 | 7/2007 | Ozawa et al. |
| 2008/0037131 A1* | 2/2008 | Steenblik et al. ........ B44F 7/00 359/619 |
| 2008/0080048 A1 | 4/2008 | Saishu et al. |

(Continued)

FOREIGN PATENT DOCUMENTS

| EP | 2 159 040 | 3/2010 |
| JP | 2001-301052 | 10/2001 |

(Continued)

*Primary Examiner* — Stephone B Allen
*Assistant Examiner* — Ryan S Dunning
(74) *Attorney, Agent, or Firm* — Norris McLaughlin & Marcus, P.A.

(57) ABSTRACT

A lens array sheet has a glass base and a resin lens array layer formed on the glass base, wherein the resin lens array layer includes a plurality of resin lenses and preferably includes a composite material having nanoparticles added to a matrix of the resin and the plurality of resin lenses are formed on the glass base substantially independently from each other.

9 Claims, 6 Drawing Sheets

(56) References Cited

U.S. PATENT DOCUMENTS

| | | | |
|---|---|---|---|
| 2008/0186585 A1 | 8/2008 | Mino et al. | |
| 2010/0117503 A1* | 5/2010 | Mizuno et al. | 313/110 |
| 2011/0006447 A1 | 1/2011 | Hara | |
| 2014/0043681 A1* | 2/2014 | Ishii | B82Y 20/00 359/463 |

FOREIGN PATENT DOCUMENTS

| | | |
|---|---|---|
| JP | 2002-122706 | 4/2002 |
| JP | 2004-077981 | 3/2004 |
| JP | 2004-77981 | 3/2004 |
| JP | 2004-177574 | 6/2004 |
| JP | 2004217714 A * | 8/2004 |
| JP | 2004-354419 | 12/2004 |
| JP | 2005-36174 | 2/2005 |
| JP | 2007-140543 | 6/2007 |
| JP | 2008-89906 | 4/2008 |
| JP | 2008-224825 | 9/2008 |
| JP | 2008-290357 | 12/2008 |
| JP | 2009-198830 | 9/2009 |
| JP | 2011-238571 | 11/2011 |
| WO | WO-2006/038648 | 4/2006 |
| WO | WO-2009/101883 | 8/2009 |

* cited by examiner

LENS ARRAY SHEET HAVING GLASS BASE AND NANOPARTICLE-CONTAINING RESIN LENS ARRAY LAYER WITHOUT A RESIN PLANAR LAYER THEREBETWEEN

BACKGROUND OF THE INVENTION

The invention relates to lens array sheets used for stereoscopic photography and stereoscopic printing and picture display apparatuses, more particularly to lens array sheets used in display apparatuses that are demanded to meet the requirements of dimensional accuracy and dimensional stability for image display.

In recent years, it has been known to dispose a lens array sheet including an array of cylindrical lenses (lenticular lenses) is disposed on the front face of a planar display apparatus such as a liquid crystal display panel so that viewers can stereoscopically watch images without wearing any dedicated eye glasses.

The lens array sheet is a light beam control device to be disposed on the front faces of display apparatuses where pixel positions are fixed, for example, liquid crystal display apparatuses for direct viewing or projection, plasma display apparatuses, and organic EL display apparatuses. The light beam control device controls light beams from the display apparatuses to present stereoscopic images in the direction of viewers. There are different types of lens array sheets; glass-made lens array sheets, resin-made lens array sheets, and lens array sheets having a structure where a resin sheet is bonded to a glass base.

FIG. 7 illustrates a glass lens array sheet 100 to be disposed on the front faces of apparatuses that display stereoscopic images. The lens array sheet 100 has a base 101 and a lens array layer 102. The base 101 and the lens array layer 102 are both made of glass and integrally formed. A flat glass is used to form the base 101. The lens array layer 102 has a plurality of glass cylindrical lenses that are adjacently juxtaposed and unidirectionally in parallel with one another.

In the glass lens array sheet 100, the glass base 101 is, for example, processed by press molding and subjected to physical and/or chemical treatments, and the glass lens array layer 102 is directly formed on the resulting glass base 101 without an intermediate base therebetween. In the lens array sheet 100 entirely made of glass, its coefficient of linear thermal expansion is small, and the glass of the lenses and the glass of pixels have an equal coefficient of linear thermal expansion. These factors effectively lessen the variability of a juxtaposition pitch of the cylindrical lenses that may be caused by temperature changes, thereby ensuring that an expected alignment is retained between the juxtaposition pitch of the cylindrical lenses and a pixel pitch (the pixels are arranged on the opposite side of the stereoscopic vision side (viewer's eye position) of the lens array sheet 100). As a result, a level of performance required to stereoscopically display images is reliably maintained over a long period of time. However, a problem of the lens array sheet is a μm-order fine glass processing demanded for the lens array layer, which increases production cost.

FIG. 8 illustrates a resin lens array sheet 200. In the lens array sheet 200, a resin base 201 and a resin lens array layer 202 are integrally formed, or the resin lens array layer 202 is directly formed on the resin base 201. The resin lens array layer 202 has a plurality of cylindrical lenses that are adjacently juxtaposed and unidirectionally in parallel with one another.

The lens array sheet 200 is made of a resin, for example, polymethyl methacrylate, polycarbonate, or polyethylene terephthalate. Unlike any glass lens array sheets, the lens array sheet 200 thus characterized can be inexpensively produced by extrusion molding or injection molding. On the other hand, the resin used to form the lens array sheet 200 is easily deformed by temperature changes. This generates the following problems: dimensional accuracy is lowered, submicron-order molding precision is not obtained in in-plane direction, and film expansion and contraction when bonded to a panel may lead to a poor alignment with high-definition panels and mid-sized to large panels. These problems make it difficult to reliably maintain a level of performance required to stereoscopically display images.

FIG. 9 is a sectional view of a hybrid lens array sheet 300 including a resin and glass as its materials, which was provided to solve the conventional problems. In the lens array sheet 300, a base 301 is made of a glass and a lens array layer 302 is made of a resin, and the glass base 301 and the resin lens array layer 302 are bonded to each other with an adhesive layer 303 interposed therebetween. In this lens array sheet, the lens array layer 302 has cylindrical lens portions 302a and a planar base layer 302b. The planar base layer 302b is left because the resin lens array layer 302 formed by press molding cannot be further thinned, or the planar base layer 302b is formed as a base that serves to retain the cylindrical lens portions 302a. The lens array sheet 100 of FIG. 7 entirely made of glass requires a large production cost although a high level of performance is reliably maintained. The lens array sheet 200 of FIG. 8 entirely made of a resin is inexpensively produced although a high level of performance is difficult to maintain. Unlike these lens array sheets, the lens array sheet 300 illustrated in FIG. 9, which is a resin-glass hybrid sheet, is an inexpensive sheet that reliably demonstrates a high level of performance over a long period of time.

Related art documents are JP Patent Application Publication No. 2009-198830 and JP Patent Application Publication No. 2008-089906.

SUMMARY OF THE INVENTION

The hybrid lens array sheet 300 illustrated in FIG. 9, however, has the following disadvantage. The coefficient of linear thermal expansion of the resin lens array layer 302 is about ten times larger than the coefficient of linear thermal expansion of the glass base 301. When temperature changes occur, therefore, the amount of expansion and contraction of the resin lens array layer 302 in planar direction significantly increases as compared to the amount of expansion and contraction of the glass base 301. As a result, the dimensional accuracy is lowered, and a level of performance required to stereoscopically display images is difficult to maintain. In the case where a very thin glass is used, the base 301 is easily deformed, for example, the base 301 may be warped or undulated in the direction of an arrow A or an arrow B.

If the glass base 301 is increased in thickness for a better dimensional stability to solve these conventional problems, the adjustment of tolerances in optical design is subject to restrictions, for example, where the lens array sheet should be directed when a light for a stereoscopic viewing is focused on the side of a viewer's eye to display a stereoscopic image. Other problems are: increased thickness and accordingly increased weight of the lens array sheet, and dependence of the dimensional accuracy of the lens array sheet on plastic molding accuracy.

The invention is directed at reducing the restrictions by thinning the glass base while at the same time making full use of the advantages of the hybrid sheets such as inexpensiveness and favorable dimensional stability, achieving weight and thickness reductions, preventing deformations of the thinned glass base such as warping due to temperature changes, and reliably maintaining a level of performance required to display stereoscopic images over a long period of time. The invention provides a lens array sheet that fulfills these requirements and a display apparatus equipped with such a lens array sheet.

A lens array sheet according to the invention has a glass base, and a resin lens array layer formed on the glass base, wherein the resin lens array layer includes a composite material having nanoparticles added to a matrix resin thereof.

A lens array sheet according to the invention has a glass base, and a resin lens array layer formed on the glass base, wherein the resin lens array layer includes a plurality of resin lenses, and the plurality of resin lenses are formed on the glass base substantially independently from each other.

The description, "substantially independently from each other", includes a structure where the resin lens array layer alone is formed on the glass base in the absence of a planar base layer.

In the lens array sheets according to the invention having the latter structure, the resin lens array layer preferably includes a composite material having nanoparticles added to a matrix resin thereof.

Adding the nanoparticles to the matrix resin succeeds in reducing an apparent coefficient of linear thermal expansion of the resin lens array layer. The nanoparticles are preferably added to the matrix resin to a density from 5 to 60 vol % for the following reasons: the apparent coefficient of linear expansion of the resin lens array layer is effectively reduced, a level of performance required to stereoscopically display images is reliably maintained, and deformations of the glass base due to temperature changes are controlled although the glass base is reduced in thickness to 50 μm or less. The density of the nanoparticles to be added is more preferably 5 to 55 vol % and most preferably 5 to 50 vol %.

According to the invention, particle sizes of the nanoparticles are preferably decided by comparing an index of refraction of the nanoparticles to an index of refraction of the matrix resin.

In the case where the matrix resin and the nanoparticles have an equal index of refraction, the particle sizes of the nanoparticles are equal to or smaller than $2/10$ of the thickness of the resin lens array layer irrespective of how thick the resin lens array layer is.

In the case where the matrix resin and the nanoparticles have different indices of refraction, the particle sizes of the nanoparticles are:
- equal to or smaller than 100 nm for any thicknesses of the resin lens array layer smaller than 10 μm.
- equal to or smaller than 50 nm for any thicknesses of the resin lens array layer equal to or larger than 10 μm and smaller than 100 μm, and
- equal to or smaller than 20 nm for any thicknesses of the resin lens array layer equal to or larger than 100 μm.

These requirements accomplish two objects: reducing the apparent coefficient of linear expansion of the resin lens array layer, and ensuring a light transmittance of 90% or more in the lens array layer.

The glass used in the glass base is not particularly limited. The resin lenses constituting the resin lens array layer may be selected from various lenses, including spherical lenses and aspherical lenses. The resin lenses constituting the resin lens array layer are not necessarily limited to the cylindrical lenses but may be, for example, micro lenses or fly-eye lenses. The lens array sheet may be a lens array sheet where such lenses are one-dimensionally or two-dimensionally arranged.

The resin used to form the resin lens array layer is not particularly limited. Examples of the material of the nanoparticles are, though not particularly limited, metallic oxide fine particles, metallic fine particles, organic fine particles, and organic and inorganic hybrid fine particles. The metallic oxide fine particles are of, for example, silicon oxides, aluminum oxides, zinc oxides, tin oxides, indium oxides, zirconium oxides, cerium oxides, or titanium oxides. The metallic fine particles are of, for example, gold or silver. The organic fine particles are of, for example, melamine-formaldehyde condensates, polymethyl methacrylate crosslinks, hyperbranched polymers, or dendrimers. The nanoparticles are not necessarily limited to spherical fine particles but may be rod-shaped, wire-shaped, fiber-shaped, or sheet-shaped particles. The lens array sheet according to the invention is preferably mounted on a display unit used to stereoscopically display images.

In the lens array sheet according to the invention, the resin lens array layer includes the composite material having the nanoparticles added to the matrix resin. This reduces the apparent coefficient of linear thermal expansion of the resin lens array layer, thereby controlling the amount of expansion and contraction of the resin lens array layer due to temperature changes. Further, the lens array sheet exerts such a remarkable technical effect while taking advantage of the inexpensiveness of the hybrid lens array sheets.

In the lens array sheet according to the invention, the plural resin lenses directly formed on the glass base with practically no planar base layer constitute the resin lens array layer, and the resin lenses are disposed on the glass base substantially independently from each other. When the resin lenses are fixed to the glass base, the apparent coefficient of linear thermal expansion of the whole resin lens array layer becomes smaller although each of the resin lenses has a coefficient of linear thermal expansion larger than that of the glass base. This controls the amount of expansion and contraction of the resin lens array layer due to temperature changes.

Further advantages of the lens array sheet provided by the invention are that the glass base can be reduced in thickness and a degree of freedom is thereby increased in optical design for stereoscopic image display, thickness and weight reductions are achieved, and a level of performance required to stereoscopically display images is reliably maintained over a long period of time.

DETAILED DESCRIPTION OF THE INVENTION

Hereinafter is described a lens array sheet according to an embodiment of the invention to be used in stereoscopic image display apparatuses. The lens array sheet according to the embodiment may be used for stereoscopic photography and stereoscopic printing. The lens array sheet is effectively used in display apparatuses that are demanded to meet the requirements of dimensional accuracy and dimensional stability for image display.

Figure 1:
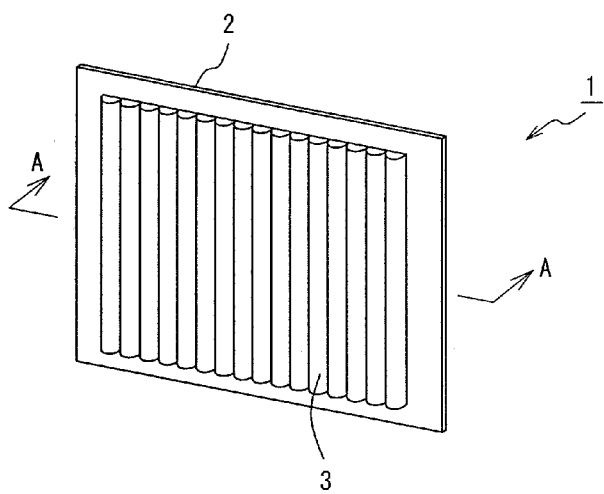
FIG. 1 is a perspective view of a lens array sheet according to an embodiment of the invention to be used in stereoscopic image display apparatuses.
Figure 2A:
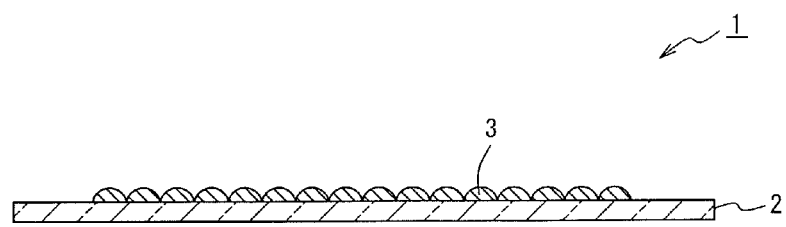
FIG. 2A is an enlarged sectional view of the illustration of FIG. 1 cut along A-A line.
Figure 2B:
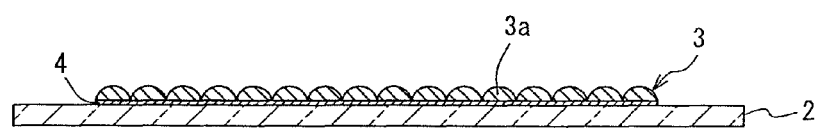
FIG. 2B is an enlarged sectional view of a modified embodiment of the invention.
Figure 2C:
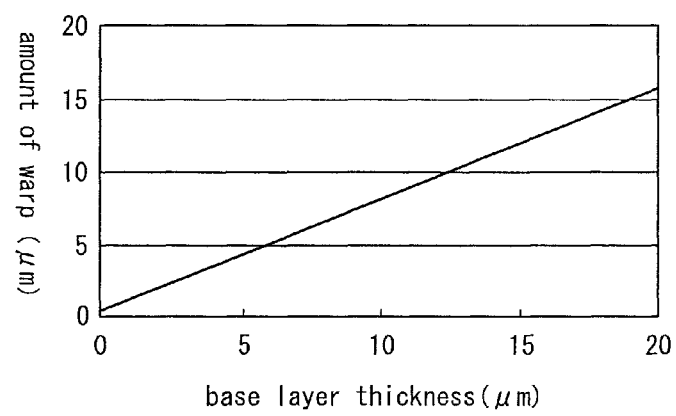
FIG. 2C is an illustration of a relationship between a thickness of a planar base layer 4 and an amount of warp of a lens array sheet 1.
Figure 3:
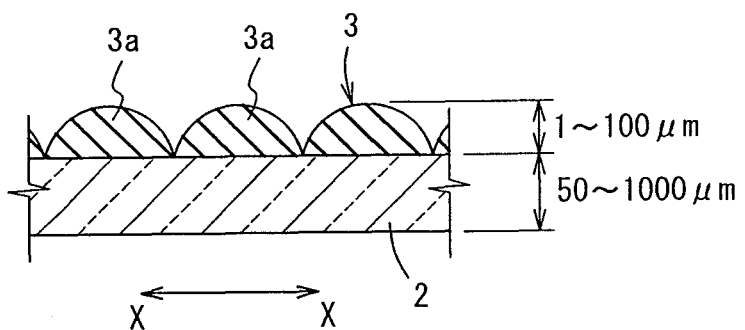
FIG. 3 is a sectional view illustrating an enlarged part of FIG. 2A.
Figure 4:
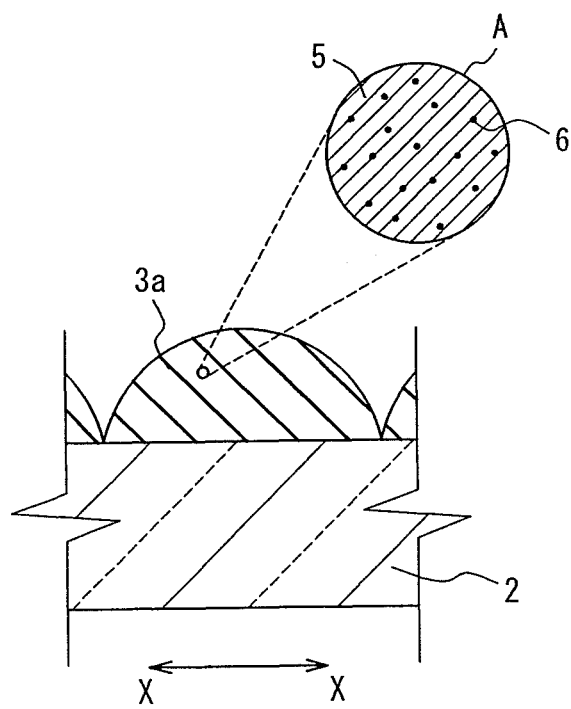
FIG. 4 is a sectional view illustrating an enlarged part of FIG. 3 and used to describe materials of a lens array layer.

FIG. 1 is a perspective view of the lens array sheet. FIG. 2A is a sectional view of the lens array sheet cut along A-A line. FIG. 2B is an enlarged sectional view of a lens array sheet according to a modified embodiment. FIG. 2C is an illustration of a relationship between a thickness of a planar base layer 4 and an amount of warp of a lens array sheet 1 affected by the thickness of the base layer. FIG. 3 is a sectional view illustrating an enlarged part of FIG. 2A. FIG. 4 is a sectional view illustrating an enlarged part of FIG. 3 and used to describe materials of a resin lens array layer.

Referring to these drawings, the lens array sheet 1 according to the embodiment has a glass base 2 having flat surfaces, and a resin lens array layer 3 formed on the glass base 2.

Figure 9:
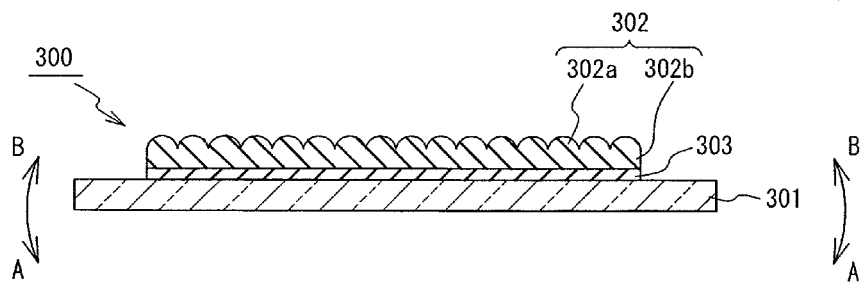
FIG. 9 is a sectional view of yet another conventional lens array sheet.

The resin lens array layer 3, where a planar base layer 3 illustrated in FIG. 9 is not provided, has cylindrical lens portions 3a alone. The cylindrical lens portions 3a include a plurality of cylindrical lenses that are adjacently juxtaposed and unidirectionally in parallel with one another. The resin lens array layer 3 may be provided with no planar base layer, or the resin lens array layer 3 may be provided with a resin planar base layer 4 formed in a very small thickness between the cylindrical lens portions 3a and the glass base 2 as illustrated in FIG. 2B. In the resin lens array layer 3 provided in either way, the plural cylindrical lens portions 3a are formed on the glass base 2 substantially independently from one another. In the structure where the planar base layer 4 is provided, a largest thickness value of the planar base layer 4 is defined based on a tolerance of an amount of warp of the lens array sheet 1 under the influence of the base layer thickness. When the lens array sheet 1 is bonded to a panel, a bonding gap is, for example, 50 μm. FIG. 2C illustrates a relationship in the structure between the thickness of the planar base layer 4 and the amount of warp of the lens array sheet 1 under the influence of the base layer thickness. Referring to FIG. 2C, when the tolerance of the amount of warp of the lens array sheet 1 under the influence of the base layer thickness is 5 μm, for example, the largest thickness value of the planar base layer 4 is 6 μm. Thus, the largest thickness value of the planar base layer 4 can be calculated based on the amount of warp of the lens array sheet 1 under the influence of the base layer thickness. Generalizing the thickness value in the context of a correlation between the thickness of the glass base 2 and the thicknesses of the cylindrical lens portions 3a, the thickness of the planar base layer 4 is equal to or smaller than 4/100 of the thickness of the glass base 2 or equal to or smaller than 4/10 of the thickness of the resin lens array layer 3.

Thus characterized, the resin lens array layer 3 is smaller in thickness than the conventional resin lens array layers. The glass base 2 also is smaller in thickness than any conventional ones. The resin lens array layer 3 is disposed on a surface of the glass base 2 except a peripheral portion of the glass base 2, however, may be disposed on a whole area of the surface of the glass base 2.

The thickness of the resin lens array layer 3 is, for example, 0.1 to 200 μm and preferably 1 to 100 μm. The thickness of the glass base 2 is, for example, 30 to 2000 μm and preferably 50 to 1000 μm.

A material used to form the glass base 2 is not particularly limited as far as the material has a coefficient of linear expansion equal to or smaller than 100 ppm/° C. Examples of such a material are aluminosilicate glass, borosilicate glass, soda lime glass, and tempered glass of such.

A resin used to form the resin lens array layer 3 is not particularly limited. Examples of the resin are (a) thermoplastic resins such as polymethyl methacrylate, polycarbonate, and cycloolefin polymers: (b) thermosetting resins (including room temperature setting resins) such as diethylene glycol allyl carbonate, siloxanyl methacrylate, and polysiloxane; (c) photo-setting resins such as cationic-polymerizable resins such as cycloaliphatic epoxy, glycidyl ether, oxetane, and vinylether, e.t.c.; radical polymerizable resins such as mono-functional/poly-functional acryl monomers, and acryl oligomers such as epoxy acrylate, urethane acrylate, and polyester acrylate; and polyene/polythiol-based resins; and (d) thermo-setting/photo-setting organic and inorganic hybrid resins.

As described so far, the lens array sheet 1 according to the embodiment is structurally characterized in that the resin lens array layer 3 formed in a small thickness and a coefficient of linear expansion different to that of the glass base 2 is formed on the glass base 2 formed in a small thickness. In the lens array sheet 1, the resin lens array layer 3 includes a composite material having nanoparticles 6 added to a matrix resin 5 thereof as illustrated in FIG. 4. By thus adding the nanoparticles 6 to the matrix resin 5, the glass base 2 is prevented from deforming, for example, warping even though the resin lens array layer 3 is expanded and contracted in planar direction during temperature changes. Because the resin lens array layer 3 is a composite layer having the nanoparticles 6 added thereto, the apparent coefficient of linear thermal expansion of the resin lens array layer 3 has a small value.

Examples of the nanoparticles 6 are:
  metallic oxide fine particles of silicon oxides, aluminum oxides, zinc oxides, tin oxides, indium oxides, zirconium oxides, cerium oxides, and titanium oxides,
  metallic fine particles of gold and silver,
  organic fine particles of melamine-formaldehyde condensates, polymethyl methacrylate crosslinks, hyperbranched polymers, and dendrimers, and
  organic and inorganic hybrid fine particles.

As enlarged and illustrated in FIG. 3, the resin lens array layer 3 has a thickness of about 1 to 100 μm with practically no planar base layer, and the cylindrical lens portions 3a having a thickness of about 1 to 100 μm are directly formed on the glass base 2 substantially independently from one another. This structural feature controls possible expansion and contraction of the whole cylindrical lens portions 3a against environmental temperature changes, thereby reducing an impact on the glass base 2 that may be caused by the expansion and contraction. Moreover, the apparent coefficient of linear expansion of the cylindrical lens portions 3a is further reduced by adding the nanoparticles 6 to the matrix resin 5 of the resin lens array layer 3. These technical advantages greatly reduce an amount of expansion and contraction of each cylindrical lens portion 3a in a direction where the cylindrical lens portions are juxtaposed (X-X direction in the drawing) when temperature changes occur. As a result, the glass base 2 is not affected by such a deformation force that was described referring to the conventional examples.

The lens array sheet 1 according to the embodiment, which is a hybrid lens array sheet having the glass base 2 and the resin lens array layer 3, therefore, exerts the following technical effects while making full use of the advantages of the conventional hybrid lens array sheets such as inexpensiveness. The apparent coefficient of liner thermal expansion of the resin lens array layer 3 is lowered by adding the nanoparticles 6 to the matrix resin 5 of the resin lens array layer 3. This controls possible expansion and contraction of the resin lens array layer 3 that may be caused by temperature changes, allowing thickness reduction of the glass base 2. In the lens array sheet 1 according to the embodiment, the glass base 2 is thinner but is prevented from deforming, for example, warping even though temperature changes occur. The lens array sheet 1 according to the embodiment, due to its technical advantages, can reliably maintain a level of performance required to stereoscopically display images over a long period of time.

To surely lower the apparent coefficient of linear thermal expansion of the resin lens array layer 3, the nanoparticles 6 are preferably added to the matrix resin 5 to a density of 5 to 60 vol %. The addition of the nanoparticles 6 to any density lower than this range of densities fails to lower the apparent coefficient of linear thermal expansion. The upper limit in the range of densities is the upper limit of the nanoparticles that can be loaded in the matrix resin 3. The density of the nanoparticles exceeding the upper limit results in a decreased strength of the resin lens array layer 3. In the context of these aspects, the range of densities of the nanoparticles 6 is more preferably 5 to 55 vol % and most preferably 5 to 50 vol %.

The particle sizes of the nanoparticles 6 affect the light transmittance of the cylindrical lens portions 3a. To reduce the loss of extracted light, the embodiment defines the particle sizes of the nanoparticles 6 to such values that light irradiated from the side of a display apparatus and entering the lens array sheet 1 transmits through the lens array sheet 1 at a light transmittance of 90% or more. The display apparatus will be described later.

Figure 5A:
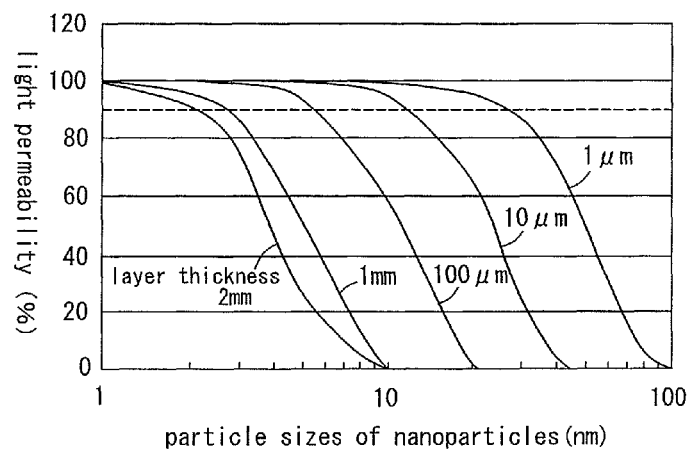
FIG. 5A is a diagram (1) illustrating a light transmittance of the lens array layer, where the lateral axis represents particle sizes of nanoparticles and the longitudinal axis represents the light transmittance.
Figure 5B:
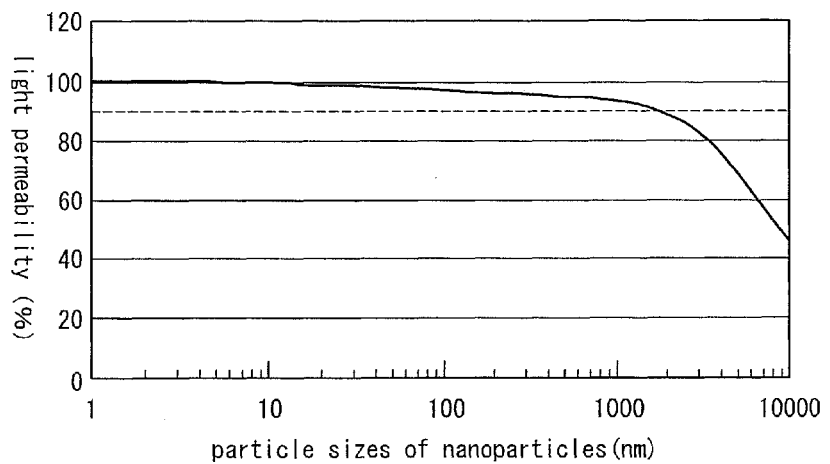
FIG. 5B is a diagram (2) illustrating the light transmittance of the lens array layer, where the lateral axis represents particle sizes of nanoparticles and the longitudinal axis represents the light transmittance.

Examples of the particle sizes of the nanoparticles 6 to be defined are described referring to FIGS. 5A and 5B. First, the particle sizes in the case where the matrix resin 5 and the nanoparticles 6 have different indices of refraction are described referring to FIG. 5A. FIG. 5A is an evaluation result of particle sizes of the nanoparticles 6 (index of refraction=1.9, added by 30 vol %) at which the light transmits through the resin lens array layer 3 at the light transmittance of 90% when the thickness of the resin lens array layer 3 (index of refraction=1.5) is 1 μm, 10 μm, 100 μm, 1 mm, and 2 mm. The evaluation result indicates that it is necessary for the particle sizes of the nanoparticles 6 to be smaller as the thickness of the resin lens array layer 3 is larger so that the light entering the lens array sheet 1 transmits through the lens array sheet 1 at a light transmittance of 90% or more. The index of refraction of the nanoparticles and the volume of the nanoparticles to be added are also important factors for reduction of light loss by scattering.

Next, the particle sizes in the case where the matrix resin 5 and the nanoparticles 6 have an equal index of refraction (index of refraction≈1.5) are described referring to FIG. 5B. FIG. 5B is an evaluation result of particle sizes of the nanoparticles 6 at which the light transmits through the resin lens array layer 3 at the light transmittance of 90% when the thickness of the resin lens array layer 3 is 10 μm and the nanoparticles 6 are added by 30 vol %. The evaluation result says that a light transmittance of 90% or more is ensured as long as the particle sizes of the nanoparticles 6 are equal to or smaller than 2000 nm.

Though not illustrated in the drawings, the particle sizes of the nanoparticles 6 at which the light transmits through the resin lens array layer 3 at the light transmittance of 90% were evaluated for thickness values of the matrix resin 5 different by 1 μm or less. In the evaluation, the matrix resin 5 and the nanoparticles 6 had an equal index of refraction (index of refraction≈1.5) and the nanoparticles 6 were added by 30 vol %. A result obtained from the evaluation is given below.

For the matrix resin 5 having the thickness of 100 nm, a light transmittance of 90% or more is ensured when the particle sizes of the nanoparticles 6 are equal to or smaller than 20 nm.

For the matrix resin 5 having the thickness of 200 nm, a light transmittance of 90% or more is ensured when the particle sizes of the nanoparticles 6 are equal to or smaller than 40 nm.

For the matrix resin 5 having the thickness of 300 nm, a light transmittance of 90% or more is ensured when the particle sizes of the nanoparticles 6 are equal to or smaller than 60 nm.

For the matrix resin 5 having the thickness of 400 nm, a light transmittance of 90% or more is ensured when the particle sizes of the nanoparticles 6 are equal to or smaller than 80 nm.

For the matrix resin 5 having the thickness of 500 nm, a light transmittance of 90% or more is ensured when the particle sizes of the nanoparticles 6 are equal to or smaller than 100 nm.

For the matrix resin 5 having the thickness of 600 nm, a light transmittance of 90% or more is ensured when the particle sizes of the nanoparticles 6 are equal to or smaller than 120 nm.

For the matrix resin 5 having the thickness of 700 nm, a light transmittance of 90% or more is ensured when the particle sizes of the nanoparticles 6 are equal to or smaller than 140 nm.

For the matrix resin 5 having the thickness of 800 nm, a light transmittance of 90% or more is ensured when the particle sizes of the nanoparticles 6 are equal to or smaller than 160 nm.

For the matrix resin 5 having the thickness of 900 nm, a light transmittance of 90% or more is ensured when the particle sizes of the nanoparticles 6 are equal to or smaller than 180 nm.

For the matrix resin 5 having the thickness of 1000 nm, a light transmittance of 90% or more is ensured when the particle sizes of the nanoparticles 6 are equal to or smaller than 200 nm.

Though not illustrated in the drawings, the particle sizes of the nanoparticles 6 at which the light transmits through the resin lens array layer 3 at the light transmittance of 90% were evaluated for thickness values of the matrix resin 5 different by 1 mm or less. In the evaluation, the matrix resin 5 and the nanoparticles 6 had different indices of refraction and the nanoparticles 6 were added by 30 vol %. A result obtained from the evaluation is given below.

For the matrix resin 5 having the thickness of 100 nm, a light transmittance of 90% or more is ensured when the particle sizes of the nanoparticles 6 are equal to or smaller than 20 nm.

For the matrix resin 5 having the thickness of 200 nm, a light transmittance of 90% or more is ensured when the particle sizes of the nanoparticles 6 are equal to or smaller than 40 nm.

For the matrix resin 5 having the thickness of 300 nm, a light transmittance of 90% or more is ensured when the particle sizes of the nanoparticles 6 are equal to or smaller than 60 nm.

For the matrix resin 5 having the thickness of 400 nm, a light transmittance of 90% or more is ensured when the particle sizes of the nanoparticles 6 are equal to or smaller than 80 nm.

For the matrix resin 5 having the thickness of 500 to 1000 nm, a light transmittance of 90% or more is ensured when the particle sizes of the nanoparticles 6 are equal to or smaller than 100 nm.

Based on these evaluation results, the embodiment defines the particle sizes of the nanoparticles 6 as follows. For any thicknesses of the resin lens array layer 3 smaller than 10 μm, the particle sizes of the nanoparticles 6 are preferably equal to or smaller than $2/10$ of the thickness of the resin lens array layer 3 as long as the index of refraction of the nanoparticles 6 is equal to the index of refraction of the matrix resin 5, and the particle sizes are preferably equal to or smaller than 100 nm in the case where the indices of refraction are different.

For any thicknesses of the resin lens array layer 3 equal to or larger than 10 μm and smaller than 100 μm, the particle sizes of the nanoparticles 6 are preferably equal to or smaller than $2/10$ of the thickness of the resin lens array layer 3 as long as the index of refraction of the nanoparticles 6 is equal to the index of refraction of the matrix resin 5, and the particle sizes are preferably equal to or smaller than 50 nm in the case where the indices of refraction are different.

For any thicknesses of the resin lens array layer 3 equal to or larger than 100 μm, the particle sizes of the nanoparticles 6 are preferably equal to or smaller than $2/10$ of the thickness of the resin lens array layer 3 as long as the index of refraction of the nanoparticles 6 is equal to the index of refraction of the matrix resin 5, and the particle sizes are preferably equal to or smaller than 20 nm in the case where the indices of refraction are different.

It is concluded that the particle sizes of the nanoparticles 6 can be defined as follows: the particle sizes of the nanoparticles 6 are equal to or smaller than $2/10$ of the thickness of the resin lens array layer 3 as long as the nanoparticles 6 and the matrix resin 5 have an equal index of refraction irrespective of how thick the resin lens array layer 3 is.

In the case where the index of refraction of the nanoparticles 6 is different from the index of refraction of the matrix resin 5, the particle sizes of the nanoparticles 6 are:

equal to or smaller than 100 nm for any thicknesses of the resin lens array layer 3 smaller than 10 μm, equal to or smaller than 50 nm for any thicknesses of the resin lens array layer 3 equal to or larger than 10 μm and smaller than 100 μm, and equal to or smaller than 20 nm for any thicknesses of the resin lens array layer 3 equal to or larger than 100 μm.

As described so far, the particle sizes of the nanoparticles 6 are defined by comparing the indices of refraction of the matrix resin 5 and the nanoparticles 6.

Figure 6:
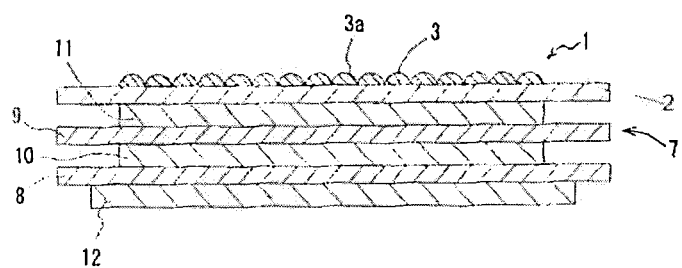
FIG. 6 is an illustration of the lens array sheet according to the embodiment embedded in a liquid crystal display panel.
Figure 7:
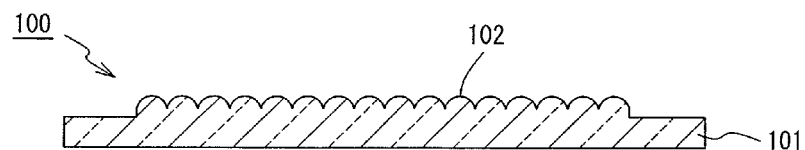
FIG. 7 is a sectional view of a conventional lens array sheet.
Figure 8:
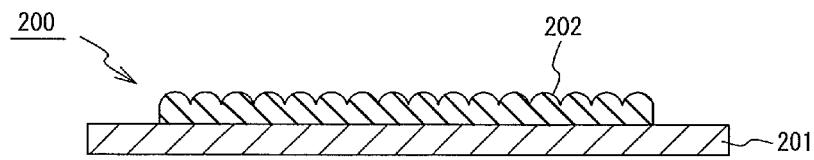
FIG. 8 is a sectional view of another conventional lens array sheet.

FIG. 6 illustrates a display apparatus where the lens array sheet 1 according to the embodiment is mounted on a liquid crystal display panel 7 which is an example of display units. Describing the structure of the liquid crystal display panel 7, a liquid crystal layer 10 including a plurality of pixels arranged in row and column directions is retained between opposing surfaces of bases 8 and 9, and optical devices 1 and 12 including polarizing plates are respectively provided on the other surfaces of the bases 8 and 9. A backlight for liquid crystal display, though provided in the display apparatus, is not illustrated in the drawing. Examples of the display apparatus are plasma display apparatuses and EL display apparatuses. The display apparatus may be other types display apparatuses.

The base 8 is formed from an insulating base having a light transmittance, for example, a glass base. The base 8 has wirings that respectively supply drive signals to the pixels on the insulating base. The wirings of the base 8 include a plurality of scanning lines arranged along the row direction of the pixels, a plurality of signal lines arranged along the column direction of the pixels, and a plurality of pixel electrodes.

The base 9 is formed from an insulating base having a light transmittance, for example, a glass base. The base 9 has counter electrodes facing the plurality of pixel electrodes and color filters (red, green, blue, black matrix) on the insulating base. The counter electrodes are made of an electrically conductive material having a light transmittance such as ITO.

In the lens array sheet 1 used in the liquid crystal display panel 7, the cylindrical lens portions 3a of the resin lens array layer 3 are unidirectionally juxtaposed in a direction in parallel with or perpendicular to the pixel arrangement. The resin lens array layer 3 may be in contact with the surface of the liquid crystal display panel 7 or may be disposed with an interval therebetween. The lens array sheet 1 may be reversely directed and mounted relative to the liquid crystal display panel 7. The lens array sheet 1 may be disposed in a diagonal direction relative to the pixel arrangement.

As described so far, the lens array sheet 1 according to the embodiment has the glass base 2 and the resin lens array layer 3 formed on the glass base 2, wherein the resin lens array layer 3 includes plural cylindrical lenses juxtaposed on the glass base 2, and the resin lens array layer 3 is a layer having the nanoparticles 6 added to the matrix resin 5. In the lens array sheet, the occurrence of temperature changes may cause the resin lens array layer 3 to expand and contract, however, the nanoparticles 6 serve to reduce the expansion and contraction. During temperature changes, therefore, the glass base 2 is not affected by a deformation force that may cause warping under the influence of the resin lens array layer 3. This allows thickness reduction of the glass base 2.

The lens array sheet provided by the embodiment accordingly accomplishes the following technical advantages:

ensuring a degree of freedom in optical design for stereoscopic image display by thinning the glass base 2, reducing possible expansion and contraction of the thinned resin lens array layer 3 caused by temperature changes and thereby avoiding the dimensional variability of the glass base 2 described hereinabove requesting related art. In the lens array sheet, therefore, the glass base 2 can be reduced in thickness, and a level of performance required to stereoscopically display images can be reliably maintained over a long period of time.

In the lens array sheet provided by the embodiment, the resin lens array layer 3 includes spherical or aspherical (elliptical, hyperbolic, or fourth order even function) resin lenses. The lens array sheet 1 provided by the embodiment has plural cylindrical lenses that are adjacently juxtaposed and unidirectionally in parallel with one another. Though not illustrated in the drawings, the embodiment includes a lens array sheet wherein a plurality of resin lenses, for example, micro or fly-eye lenses, are two-dimensionally disposed on a glass base.

The invention claimed is:

1. A hybrid lens array sheet, comprising:
a glass base having a thickness of 30-2000 µm; and
a resin lens array layer formed directly on the glass base in direct contact with the glass base, the resin lens array layer having a thickness of 0.1-200 µm, and a linear expansion coefficient that differs from that of the glass base, the entire thickness of the resin lens array layer consisting only of a plurality of resin lens portions having lens functions being in direct contact with the glass base not via a resin planar layer and being arranged in adjacent rows which are unidirectionally parallel with one another; and
wherein said resin lens array layer is comprised of a composite material having nanoparticles added to a matrix of resin;
wherein the nanoparticles and the matrix of resin have a same refractive index;
wherein the nanoparticles have a particle size equal to or less than $2/10$ said thickness of the resin lens array layer; and
wherein the nanoparticles consist of organic fine particles or organic/inorganic hybrid fine particles, and are added to the matrix of resin to a density of 5-60 vol %.

2. A display apparatus, comprising:
a hybrid lens array sheet as claimed in claim 1; and
a display unit for stereoscopic image display on which the lens array sheet is mounted.

3. A method for producing a hybrid lens array sheet, comprising: providing a glass base having a thickness of 30-2000 µm; and
forming a resin lens array layer directly on the glass base having a thickness of 0.1-200 µm, and a linear expansion coefficient that differs from that of the glass base, the entire thickness of the resin lens array layer consisting only of a plurality of resin lens portions having lens function being in direct contact with the glass base not via a resin planar layer and being arranged in adjacent rows which are unidirectionally parallel with one another;
wherein the resin lens array layer is comprised of a composite material having nanoparticles added to a matrix of resin, and
wherein the matrix resin and the nanoparticles have a same index of refraction,
wherein the nanoparticles have a particle size equal to or less than $2/10$ said thickness of the resin lens array layer,
wherein the resin lens array layer is comprised of a plurality of resin lenses aligned adjacent to each other in parallel in a single direction; and
wherein the nanoparticles consist of organic fine particles or organic/inorganic hybrid fine particles, and are added to the matrix resin to a density of 5-60 vol %.

4. A hybrid lens array sheet, comprising:
a glass base having a first face and a second face opposite the first face and a thickness of 30-2000 µm; and
a resin lens array layer formed directly on the glass base in direct contact with the first face of the glass base, the resin lens array layer having a thickness of 0.1-200 µm, and a linear expansion coefficient that differs from that of the glass base, the entire thickness of the resin lens array layer consisting only of a plurality of resin lenses in direct contact with the glass base without an intervening resin planar layer and arranged in adjacent rows which are unidirectionally parallel with one another; and
wherein the second face has no resin layer adhered thereto;
wherein said resin lens array layer is comprised of a composite material having nanoparticles added to a matrix of resin;
wherein the nanoparticles and the matrix of resin have a same refractive index;
wherein the nanoparticles have a particle size equal to or less than $2/10$ said thickness of the resin lens array layer; and
wherein the nanoparticles consist of organic fine particles or organic/inorganic hybrid fine particles, and are added to the matrix of resin to a density of 5-60 vol %.

5. A display apparatus, comprising:
a hybrid lens array sheet as claimed in claim 4; and
a display unit for stereoscopic image display on which the lens array sheet is mounted.

6. A method for producing a hybrid lens array sheet, comprising:
providing a glass base having a first face and a second face opposite the first face and a thickness of 30-2000 µm; and
forming a resin lens array layer directly on the first face of the glass base having a thickness of 0.1-200 µm, and a linear expansion coefficient that differs from that of the glass base, the entire thickness of the resin lens array layer consisting only of resin lenses in direct contact with the glass base without an intervening resin planar layer and arranged in adjacent rows which are unidirectionally parallel with one another;
wherein no resin layer is adhered to the second face;
wherein the resin lens array layer is comprised of a composite material having nanoparticles added to a matrix of resin, and
wherein the matrix resin and the nanoparticles have a same index of refraction,
wherein the nanoparticles have a particle size equal to or less than $2/10$ said thickness of the resin lens array layer,
wherein the resin lens array layer is comprised of a plurality of resin lenses aligned adjacent to each other in parallel in a single direction; and
wherein the nanoparticles consist of organic fine particles or organic/inorganic hybrid fine particles, and are added to the matrix resin to a density of 5-60 vol %.

7. The hybrid lens array sheet according to claim 1, wherein the resin lens array is formed directly on and in contact with a first face of the glass base and a second face of the glass base opposite the first face of the glass base has no resin layer adhered thereto.

8. A display apparatus comprising:
   a hybrid lens array sheet as claimed in claim 7; and
   a display unit for stereoscopic image display on which the lens array sheet is mounted.

9. The method for producing a hybrid lens array shot according to claim 3, wherein the resin lens array is formed directly on and in contact with a first face of the glass base and no resin layer is adhered to a second face of the glass base opposite the first face of the glass base.

* * * * *